3,467,535
REFRACTORY INSULATING COMPOSITIONS
Thomas A. Myles, Tonawanda, N.Y., assignor to The Carborundum Company, Niagara Falls, N.Y., a corporation of Delaware
No Drawing. Filed Oct. 17, 1966, Ser. No. 586,973
Int. Cl. C04b 35/02
U.S. Cl. 106—64                                                    12 Claims

ABSTRACT OF THE DISCLOSURE

An insulating, castable refractory composition is produced by mixing aluminum silicate fibers, very finely divided amorphous silica and a calcium aluminate binder with water, the amount of water used controlling the density of articles cast therefrom. Products having densities between 0.48 g./cc. and 1.28 g./cc. are obtainable.

---

This invention relates to refractory insulating compositions and more particularly to improved hydraulic setting, ceramic fiber containing, castable refractory insulating products and compositions, and the preparation thereof.

There is a constantly growing need for more effective insulating materials capable of withstanding high temperatures encountered in modern day technology which can be readily formed into a variety of shapes. A particular need exists in the area of melting, transporting and casting of non-ferrous metals where insulating materials must possess high strength, high resistance to erosion and wetting by the metal, good thermal shock resistance, and have good thermal insulating properties at the high temperatures encountered during use. In addition the materials should be easy to use and relatively inexpensive.

Various refractory compositions available in the form of precast shapes have been employed, however, such products are not well suited for use as liners, crucible spouts, and the like because of their high density, or when available in the form of lightweight brick, because of their high cost. Moreover the use of brick and other preformed insulating materials is limited to relatively simple shapes and to applications which can accommodate the shape of the brick, such as in lining boilers, industrial furnaces and the like.

Although there are available refractory cements which can be cast in place, these materials normally have poor insulating characteristics at high temperatures, low strength, high density, or a combination of these which make their use undesirable.

Accordingly there is a need for a refractory composition possessing good insulating properties, good thermal shock resistance, and high resistance to erosion and wetting by molten metal, which is capable of being used at service temperatures up to about 1315° C. and which can be readily formed into relatively intricate shapes of desired densities at the user's location.

It is an object of this invention to provide an improved refractory insulating composition which can be readily cast, gunned, poured, or the like into any desired shape.

Another object of this invention is to provide a variable density refractory insulating composition capable of service at temperatures up to about 1315° C.

These and other objects and advantages of this invention will be more fully apparent from a consideration of the following description and the claims appended hereto.

It has been found that the foregoing objects are achieved by refractory mixes comprising a combination of hydraulic setting cement, as the binder component, aluminum silicate fibers, and very finely divided silica, which when activated with water form compositions which can be readily poured, cast, gunned or the like into any desired shape. The densities of the finished articles made in accordance with this invention are readily controlled by the amount of water used to activate the dry mixes and may range between about 0.48 g./cc. to about 1.28 g./cc.

The dry mix or aggregate, as it will be designated throughout the specification, comprises from about 1% to about 10% aluminum silicate fibers, from about 40% to about 98% calcium aluminate hydraulic setting binder and from about 1% to about 10% of very finely divided silica. The aggregate is activated by the addition thereto of from about 32% to about 68% of water based on the aggregate.

Aluminum silicate fibers have been found to have the necessary strength, refractoriness and low thermal conductivity which makes them particularly useful in insulation compositions made according to this invention. The fibers should have a length to diameter ratio of at least 1000 to 1 and it is preferred that they have an average length of between 12.5 mm. and 25 mm. and diameter of between 1 micron and 20 microns.

Commercially available aluminum silicate fibers normally have associated therewith unfiberized material of substantially the same composition as the fiber. This material, commercially known as shot, can be separated from the fiber prior to the fiber incorporation in the aggregate. The fibers may also be used in their commercially available form, i.e., with shot associated therewith, so long as the proportion of shot does not exceed about 40% by weight of the aggregate. It has been found that when the proportion of shot exceeds about 40% the resulting compositions have reduced strength and reduced thermal shock resistance. Lesser amounts of shot, however, can be included in compositions made according to this invention without detracting from the properties of said compositions.

The very finely divided silica should have a particle size of less than 5 microns and preferably the particles should be submicron in size. Such finely divided silica acts as a thickener for the composition when activated by water. The fine particles have the additional effect of reducing the void volume of the compositions thereby improving the insulating properties at elevated temperatures. In order to effectively act as a thickener in the composition made according to this invention, it is important that the silica particles have large surface areas. Consequently, an amorphous silica is preferred since the particles are extremely small, on the order of 12 millimicrons, and have large surface areas.

The calcium aluminate as well as the other materials used in forming the aggregate, should be relatively free of iron since the presence of appreciable quantities of iron, i.e. more than about 4%, reduces the refractory characteristics of the composition.

The following example illustrates preferred embodiment of this invention but in no way should they be construed to be limiting thereof.

EXAMPLE I

Aluminum silicate refractory fibers, very finely divided silica and finely divided calcium aluminate were blended into a dry aggregate having the following proportions:

|  | Percent |
|---|---|
| Aluminum silicate fiber | 10 |
| Silica | 7 |
| Calcium aluminate binder | 83 |
|  | 100 |

The silica used was an amorphous product of high purity, 99.8% silica, having an average particle size of about 12 millimicrons. This material is sold under the trademark Cab-O-Sil® by the Cabot Corporation. The binder was a low iron, calcium aluminate cement sold by the Universal Atlas Cement Company under the trademark Refcon®. The fibers were obtained from The Carborundum Company and were identified as Fiberfrax® aluminum silicate fibers. The fibers were previously treated in a known manner to remove substantially all the shot therefrom.

A slurry, formed by adding about 64% water to about 36% of the aggregate made as set forth above, was blended until a smooth, homogeneous mix was formed. Mixing or blending of the slurry can be accomplished with a simple paddle or ribbon-type mixer. The amount of mixing required to achieve the desired homogeneous slurry is dependent on the type of mixer and the viscosity of the slurry being mixed; however, unduly long periods of mixing should be avoided since there is a tendency to reduce the length of the fibers and thereby cause a slight reduction in the strength of the finished product.

The slurry was placed in a mold and tamped to insure complete filling of the mold. The slurry was then allowed to set up for at least 18 hours after which the resulting green shape was dried at a temperature of at least 370° C. to drive off the water. Drying was carried out for 18 to 24 hours, however, this period may vary depending on the size of the article and the drying temperature. The dried product had a density of 0.84 g./cc.

The following examples illustrate other aggregates that may be made in accordance with the teachings of this invention. The aggregates were made up using the same procedure set forth in Example I. The fiber, however, was used as commercially available and was not treated to remove the shot associated therewith.

EXAMPLE II

| | Percent |
|---|---|
| Calcium aluminate binder | 68.2 |
| Aluminum silicate fiber | 7.5 |
| Finely divided silica | 9.1 |
| Shot | 15.2 |
| | 100.0 |

EXAMPLE III

| | |
|---|---|
| Calcium aluminate binder | 70.6 |
| Aluminum silicate fiber | 7.8 |
| Finely divided silica | 5.9 |
| Shot | 15.7 |
| | 100.0 |

The following examples illustrate the variety of densities that can be achieved using compositions made according to this invention. A number of slurries were made up using the aggregates from Examples II and III but varying the proportion of water added thereto. The slurries were made and the shapes cast and dried in accordance with the procedure set forth in Example I. The aggregates used in Examples IV–VI were made in accordance with Example II while the aggregates of Examples VII–IX were made as in Example III.

| Percent aggregate | Percent water | Density, g./cc. |
|---|---|---|
| Example IV, 32 | 68 | .48 |
| Example V, 41 | 59 | .64 |
| Example VI, 48 | 52 | .80 |
| Example VII, 55 | 45 | .96 |
| Example VIII, 62 | 38 | 1.12 |
| Example IX, 68 | 32 | 1.28 |

Articles formed from the compositions of Examples IV through IX were subjected to various tests to determine their physical characteristics. These materials were tested for modulus of rupture according to ASTM Method C–133–55 and stress vs. percent deformation according to ASTM Method C–165–54. In addition the thermal conductivities of the compositions were determined according to ASTM Method C–177–63. The results are summarized in Tables A and B below:

TABLE A

| Material tested: | Density, g./cc. | Modulus of rupture, kg./cm.$^2$ | Deformation kg./cm.$^3$ for 5% compression |
|---|---|---|---|
| Example IV | .48 | 1.4 | 1.3 |
| Example V | .64 | 3.5 | 3.2 |
| Example VI | .80 | 9.1 | 7.7 |
| Example VII | .96 | 14.7 | 15.4 |
| Example VIII | 1.12 | 21.0 | 26.6 |
| Example IX | 1.28 | 32.0 | 41.3 |

TABLE B.—THERMAL CONDUCTIVITY (K)
[kg.-cal. m per hr. sq. cm. deg. cent.]

| Material: | Density, g./cc. | Mean temperature, ° C. | | | | |
|---|---|---|---|---|---|---|
| | | 427 | 538 | 649 | 760 | 871 |
| Example IV | .48 | 1.1 | 1.3 | 1.6 | 1.8 | 2.1 |
| Example V | .64 | 1.5 | 1.6 | 1.8 | 1.7 | 2.0 |
| Example VI | .80 | 1.6 | 1.8 | 1.9 | 2.1 | 2.2 |
| Example VII | .96 | 1.8 | 1.9 | 2.1 | 2.2 | 2.4 |
| Example VIII | 1.12 | 2.2 | 2.3 | 2.5 | 2.6 | 2.8 |
| Example IX | 1.28 | 2.7 | 2.9 | 3.1 | 3.1 | 3.3 |

The compositions made according to the foregoing Examples IV–IX were found to have the following chemical analysis, exclusive of water:

| | |
|---|---|
| $Al_2O_3$ | 48.1–49.8 |
| $SiO_2$ | 21.5–24.2 |
| CaO | 25.6–26.5 |
| $Fe_2O_3$ | 2 |
| Other inorganics | 1 |

The range of proportions of refractory fiber, binder, and silica usable in the refractory, insulating compositions of this invention are not critical so long as the ranges of refractory fiber and silica are each maintained between about 1% and about 10%. It has been found that when fiber percentages are above about 10% the finished composition is low in strength and its thermal conductivity is unsatisfactory. In addition it is difficult to cast a slurry containing above about 10% fiber. On the other hand, the use of less than about 1% refractory fiber results in a product that is excessively dense and which has relatively poor resistance to thermal shock. The amount of silica should also be maintained below about 10% of the aggregate in order to avoid over-thickening the slurry to the point where it is incapable of being formed conveniently into the desired shape. The amount of shot in the aggregate should not exceed 40% by weight of the aggregate. The proportion of binder is not critical and in forming the compositions it is added in such amounts as to provide the desired percentages of refractory fiber, silica and shot in the aggregate.

Pretreatment of the aluminum silicate fibers, such as by fiber surface preparation, or the formation of nodules or balls from the fiber, is neither required nor desired in forming the novel insulating refractory compositions of this invention.

The aggregates made according to this invention are suited for being bagged or otherwise packaged and shipped directly to the job location. When needed, the user may simply add a desired amount of water to the aggregate and mix to produce a slurry which can be readily formed into a desired shape.

It is clear that a wide variety of densities can be achieved with the composition of this invention simply by varying the amount of water used to activate the aggregate. However not less than about 32% nor more than about 68% water should be added to the aggregate to form the slurry since too little water results in a slurry which will not flow while excess water causes the slurry to be too thin. The choice of density is dependent on the application for which the composition of this invention is to be used and the desired flow characteristics of the slurry.

While the invention has been described in connection with specific embodiments thereof, it will be understood that it is capable of further modifications and this application is intended to cover any variations, uses or adaptations of the invention following the principles of the invention and including such departures from the present disclosure as come within known or customary practice in the art to which the invention pertains and as may be applied to the essential features hereinbefore set forth or as fall within the scope of the appended claims.

Unless otherwise stated all percentages stated in the description of this invention and the claims appended thereto are by weight.

I claim:

1. A refractory insulating composition suitable for use at temperatures up to about 1315° C. consisting essentially of about 1% to about 10% aluminum silicate fibers, about 1% to about 10% very finely divided amorphous silica and about 40% to about 98% calcium aluminate hydraulic setting binder, exclusive of water.

2. The refractory insulating composition of claim 1 consisting essentially of about 10% aluminum silicate fibers, about 7% very finely divided silica and about 83% calcium aluminate hydraulic setting binder, exclusive of water, said composition having a density of about 0.84. g./cc.

3. The refractory insulating composition of claim 1 wherein said composition consists essentially of between about 7.5% to about 7.8% aluminum silicate fibers, between about 5.9% to about 9.1% very finely divided silica and about 68.2% to about 70.6% calcium aluminate hydraulic setting binder, exclusive of water, said composition having a density of from 0.48 g./cc. to 1.28 g./cc.

4. The refractory insulating composition of claim 3 wherein said composition consists essentially of 48.1% to 49.8% $Al_2O_3$, 21.5% to 24.2% $SiO_2$, 25.6% to 26.5% CaO, about 2% $Fe_2O_3$, and about 1% of other inorganics, exclusive of water.

5. The refractory insulating composition of claim 3 wherein said composition consists essentially of about 7.5% aluminum silicate fibers, about 15.2% unfiberized material of substantially the same composition as said fibers, about 9.1% of very finely divided silica, and about 68.2% of calcium aluminate hydraulic setting binder, exclusive of water, said composition having a density of from 0.48 g./cc. to about 0.80 g./cc.

6. The refractory composition of claim 5 wherein said aluminum silicate fibers have an average length of between 12.5 mm. and 25 mm. and a length to diameter ratio of at least 1000:1.

7. The refractory composition of claim 3 wherein said composition consists essentially of about 7.8% aluminum silicate fibers, up to about 15.7% unfiberized material of substantially the same composition as said fiber, about 5.9% of very finely divided silica, and about 70.6% of calcium aluminate hydraulic setting binder, exclusive of water, said composition having a density of from about 0.96 g./cc to about 1.28 g./cc.

8. The refractory composition of claim 7 wherein said aluminum silicate fibers have an average length of between 12.5 mm. and 25 mm. and a length to diameter ratio of at least 1000:1.

9. A method for making the refractory composition of claim 1 having varying densities which comprises the steps of forming a mix consisting essentially of about 32% to about 68% of water and about 68% to about 32% of a dry mix consisting essentially of about 1% to about 10% aluminum silicate fibers, about 1% to about 10% very finely divided silica and about 40% to about 98% calcium aluminate hydraulic setting binder, forming said mix into desired shape, allowing said formed mix to set and drying said set mix to drive off said water, said composition having densities ranging between about .48 g./cc. to about 1.28 g./cc.

10. The method of claim 9 wherein said dry mix contains up to 40% of unfiberized material of substantially the same composition as said fibers.

11. A dry mix for producing a refractory insulating composition, consisting essentially of about 1% to about 10% aluminum silicate fiber, up to 40% unfiberized material of substantially the same composition as said fibers, about 1% to about 10% silica having a particle size of less than 5 microns and about 40% to about 98% finely divided calcium aluminate hydraulic setting binder.

12. The dry mix of claim 11 consisting essentially of about 7.5% to about 7.8% aluminum silicate fibers, about 15.2% to about 15.7% unfiberized material of substantially the same composition as said fibers, about 5.9% to about 9.1% amorphous silica and about 68.2% to about 70.6% finely divided calcium aluminate hydraulic setting binder.

References Cited

UNITED STATES PATENTS 3,253,936   5/1966   WEINDEL ---------- 106—64

JAMES E. POER, Primary Examiner

U.S. Cl. X.R.

106—69, 104; 252—62